March 8, 1966     R. P. BARNARD     3,238,808

FLEXIBLE CONTROL

Filed April 10, 1963

INVENTOR.
Richard P. Barnard
BY
Barnard, McGlynn & Reising
ATTORNEYS

United States Patent Office 3,238,808
Patented Mar. 8, 1966

3,238,808
FLEXIBLE CONTROL
Richard P. Barnard, Franklin, Mich., assignor to Teleflex Incorporated, North Wales, Pa., a corporation of Delaware
Filed Apr. 10, 1963, Ser. No. 271,994
4 Claims. (Cl. 74—501)

This invention relates to an improved, flexible guide conduit of the type having an inner flexible tube surrounded by a plurality of wires helically wound about the tube on a long lead, these wires in turn being surrounded by a flexible protective casing. A core element is supported for movement, longitudinal, rotary, or both, within the flexible tube for transmitting motion.

Flexible guide conduits of the type described are well known, as illustrated by U.S. Patent 3,063,303 granted to A. A. Cadwallader on Novembr 13, 1962, and are commonly used, for example, as flexible controls in marine, aircraft and other automotive vehicles and the like. Such a conduit has the outstanding feature of providing good flexibility while accommodating relatively high tension, compression and radial loads thereby assuring against rupture and minimizing losses in the motion transmitting efficiency of the core element. For optimum motion transmitting efficiency commensurate with good flexibility and reasonable cost, it is highly desirable that the inner flexible tube in which the core element moves be of an organic polymeric material which has inherent lubricative properties. For this reason it has been the common practice to use as the material for the inner tubular member either polytetrafluoroethylene, i.e., Teflon, superpolyamide, i.e., nylon, or a polyalkylene such as polyethylene, polypropylene, or one of its or their copolymers, all of which polymers have inherent lubricity along with good flxebility and strength.

Even though such a tubular member has considerable inherent lubricity, nevertheless it is sometimes desirable and often essential to provide additional lubricant in the tube by way of a grease, thick oil or the like. This is particularly true where the core element undergoes a rotary motion within the tube. Hence, the grease or oil and the inherent lubricity of the tube are intended to supplement each other, the grease or oil providing the primary lubricating effect but the inherent lubricity of the tube assuring against rapid failure in the event the grease or oil is rubbed away from one or more local areas within the tube. One of the serious difficulties is, however, that the tubular member by reason of its lubricity and smooth surface will not retain the grease, oil or other lubricant. This is a particularly troublesome problem where the core element rotates within the conduit since such rotation tends to move the grease or oil toward one end or the other of the tubular member, thereby rapidly resulting in areas void of any lubricant save that inherent in the tube. Another disadvantage of present such conduit constructions is that they preclude the use of certain organic polymer materials for the inner tubular member by reason of the deficiency of such materials in flexibility albeit they have excellent lubricity along with good strength.

It is an object of this invention to provide a conduit of the type described having improved lubricating properties.

Another object of the invention is the provision of a conduit of the type described having an improved construction which enables a wider choice of materials for the inner tubular member.

More specifically, it is an object of the present invention to provide a flexible conduit of the type described having an inner tubular member which has excellent inherent lubricity, which has improved flexibility and which, particularly in combination with an outer casing of the conduit, provides greatly improved lubrication for the movable core element within the tubular member.

These objects are accomplished in accordance with the invention by a conduit of the type described wherein the inner tubular member comprises a helical coil of organic polymeric material, such coil ideally being of a flat-sided strip of such material. The preferred organic polymeric materials are Teflon, nylon and the polyalkylenes such as polyethylene, polypropylene or their copolymers. By reason of the helically coiled construction of the inner tubular member, there is improved tube flexibility and hence other organic polymeric materials, even though of lesser inherent flexibility, can, if desired, be used for the tubular member. One example of such a material is that commercially available as Delrin. A special advantage of this wider choice of materials for the tubular member is that it enables the use of a harder plastic, even though of lesser flexibility. Increased hardness provides increased wear resistance and hence durability. Further, and perhaps most importantly, because of the coiled construction with its inherent spiral crevice, the inner tubular member has a greatly increased capacity to retain grease, oil or other flowable lubricant inserted into the tubular member. Since the outer casing of the conduit serves as a continuous and liquid impervious enclosure about the inner tubular member, lubricant inserted into the tubular member cannot escape from the conduit. Hence, by way of the combination of the outer casing and the spiralled inner tubular member, increased amounts of flowable lubricant can be inserted into the conduit such lubricant filling the voids between the wires in the sheath and being gradually fed into the inner tubular member through the spiral crevice therein by the flexing or other movement of the conduit during use.

The above and other objects, features and advantages of the invention will appear more clearly from the following detailed description of a preferred embodiment thereof made with reference to the drawings in which.

Figure 1:
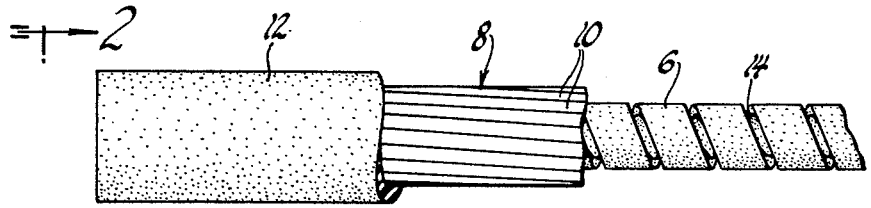
FIGURE 1 is a fragmentary side view, with parts broken away, of a flexible guide conduit constructed in accordance with the invention.
Figure 2:
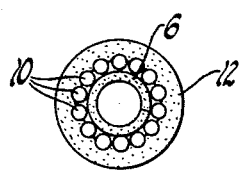
FIGURE 2 is a view taken on the line 2—2 of FIGURE 1.

Referring now to FIGURES 1 and 2, the conduit shown comprises an inner tubular member 6, constructed in accordance with the invention as described in detail hereinafter, a flexible sheath 8 comprising a plurality of wires 10 wrapped helically about the inner tubular member 6 with a long lead, and a liquid impervious flexible protective casing 12 surrounding the sheath. The wires 10 should be flexible and should preferably be of metal, ideally a metal of high tensile strength such as steel; however, if desired, some or all of the wires may be of nonmetallic material such as plastic, i.e., filaments, either monofilaments or strands, of organic polymeric material; or the wires may be of composite construction, for example a metal wire coated with plastic. Such composite sheath constructions are covered by U.S. patent applications Serial No. 191,978 filed May 2, 1962, now Patent No. 3,192,795 in the name of Donald R. Pierce, and Serial No. 214,142 filed August 1, 1962, now Patent No. 3,177,901 in the name of Donald R. Pierce both assigned to the assignee of the present invention. Hence, it will be understood the term "wire" as used herein comprehends not only metal wire, but also nonmetal wire, for example, plastic filaments, and wire of metal-nonmetal composite construction.

If desired the sheath can additionally include one or more wire or fiber rovings wrapped helically with a short lead around the plurality of wires 10 to provide added strength, particularly for high radial loads. Such structure is shown in the aforementioned Cadwallader patent.

As indicated above, the outer casing 12 should be of a liquid impervious flexible material, preferably an organic polymer such as Teflon, nylon, polyethylene, polypropylene or the like. In addition to being liquid impervious, the casing should be resistent to solution, chemical attack or other deterioration by the uusal greases and oils used as lubricants. All of the aforementioned plastics, as well as many others, are adequate in this regard.

The inner tubular member 6 comprises a helical coil of an organic polymeric material having good inherent lubricity. Hence, the interior wall of the tubular member has a helical slit or crevice 14 which extends from one end to the other thereof and which provides communication between the inner surface of the tubular member and the sheath 8. All of the aforementioned polymers are eminently satisfactory, Teflon or nylon generally being preferable for heavy duty conduit where optimum wear characteristics are desired, and the polyalkylenes being most useful in lighter duty conduit where low cost is an important factor. Preferably, the tube is formed by a helical coil of flat-sided strip of the selected organic polymer, as shown, such that the tube has a smooth cylindrical interior surface of substantially uniform diameter save for the spiral slit or crevice 14 between adjacent loops. In the embodiment shown, the loops of the spiral are considerably separated from each other thereby forming the relatively wide crevice 14. However, this is not essential; if desired, adjacent loops of the spiral can be in abutting relationship since even with the loops abutting, the slit or crevice, albeit extremely narrow, still imparts excellent lubricating and lubricant retention properties to the conduit. Preferably, the width of the crevice should be small in comparison to the width of the loops in the tubular member.

The tubular member 6 can be expeditiously formed by either of two methods. First, it can be formed by helically wrapping a flat strip of the desired organic polymeric material on a mandrel with sufficient heat being applied to cause the strip to take a set such that the strip retains the spiraled tubular shape upon withdrawal of the mandrel. The second method comprises first forming a tube of the desired diameter, as by extrusion of the organic polymeric material, and then spirally cutting the tube.

Figure 3:
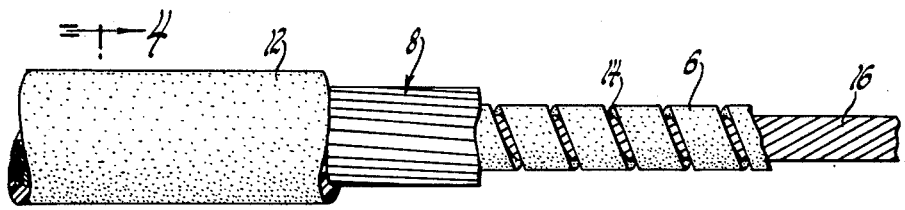
FIGURE 3 is a view of the conduit similar to that of FIGURE 1, but with a core element extending through the conduit.
Figure 4:
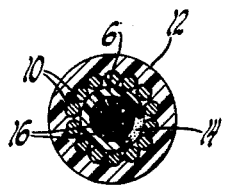
FIGURE 4 is a view taken on the line 4—4 of FIGURE 3.

The operation and advantages of the conduit can best be seen by reference to FIGURES 3 and 4 which show the conduit as it is used in practice, with a movable helically wound core element 16 extending through the tubular member 6. First, it will be manifest that by reason of the spiraled construction of the tube 6, the conduit has greater flexibility than would be the case with a conduit having a conventional inner tubular member. Of equal or greater importance, the spiral slit or crevice 14 serves to retain grease or oil within the tube thereby greatly improving the lubrication between the movable core element and the tube. This improved facility to retain lubricant is especially important where the core element movement is rotary or has a rotary component since in a conventional conduit such movement has a special tendency to pump the lubricant toward one end or the other of the tubular member thereby resulting in lubricant-free areas. It will be noted in this connection that the lay of the helically wrapped wires in the core is opposite to that of the helically split inner tube thereby decreasing the tendency of the core to pump the lubricant out of the tube.

For the optimum long-lasting lubrication there can be injected into the conduit a quantity of oil or grease sufficient to fill the voids in the interstices of the sheath between the inner tubular member and the casing, the helical split or crevice in the tubular member providing communication with such voids. The oil or grease is thereafter worked gradually to the inner surface of the tubular member by way of the flexing or other movement of the conduit during use. Since the casing is fluid impervious and is sealed at each end thereof by conventional conduit end fittings (not shown) the oil or grease cannot escape except, of course, through the spiral split or crevice in the inner tube, as is desired to provide the lubrication. Further, the pressure of the lubricant between the wires in the sheath, and the fact that lubricant can be supplied to the inner tube is of considerable advantage since good sheath lubrication is highly desirable for optimum conduit flexibility.

Hence, the invention provides a guide conduit having improved flexibility and lubricating properties without sacrifice in other desirable characteristics.

It will be understood that while the invention has been described in detail with reference to a preferred embodiment thereof, various changes and modifications may be made all within the full and intended scope of the claims which follow.

I claim:

1. In a flexible guide conduit, a flexible tubular member comprising a helically spiralled flat strip of flexible organic polymeric material, a sheath comprising a plurality of wires helically wrapped about said tubular member with a long lead and a flexible fluid impervious casing surrounding said sheath.

2. In a flexible control, a flexible tubular member comprising a helically spiralled flat strip of organic polymeric material, a sheath comprising a plurality of wires helically wrapped about said tubular member with a long lead, a flexible fluid impervious casing surrounding said sheath and a movable core element extending through said tubular member.

3. A flexible control comprising a flexible tubular member formed by a helically spiralled flat strip of organic polymeric material whereby said tubular member has a helically spiralled crevice from one end to the other thereof, the width of said crevice being narrower than the width of said strip, a sheath comprising a plurality of wires helically wrapped about said tubular member with a long lead, a flexible fluid impervious casing surrounding said sheath and a movable helically wound core element extending through said tubular member.

4. A flexible control as defined in claim 3 wherein said organic polymeric material is selected from the group consisting of polytetrafluoroethylene, the super polyamides and the polyalkylenes.

References Cited by the Examiner

UNITED STATES PATENTS

| | | | |
|---|---|---|---|
| 1,953,915 | 4/1934 | Burgett et al. | 138—131 X |
| 2,112,004 | 3/1938 | Wyzenbeek | 64—2 |
| 2,126,955 | 8/1938 | Gleason | 64—3 |
| 2,180,442 | 11/1939 | Tondeur | 64—2 |
| 2,370,884 | 3/1945 | Smith | 64—2 |
| 2,730,134 | 1/1956 | Morse | 74—501 |
| 2,801,530 | 8/1957 | Holt | 64—3 |
| 2,821,092 | 1/1958 | Cordora et al. | 64—2 |
| 3,063,303 | 11/1962 | Cadwallader | 74—501 |
| 3,093,162 | 6/1963 | Reiling | 74—501 |
| 3,135,131 | 6/1964 | Marr | 64—3 X |

BROUGHTON G. DURHAM, *Primary Examiner.*

ROBERT C. RIORDON, MILTON KAUFMAN,
*Examiners.*